(12) United States Patent
Al-Hadhrami et al.

(10) Patent No.: US 8,869,627 B2
(45) Date of Patent: Oct. 28, 2014

(54) MULTI-PHASE FLOW METERING SYSTEM

(75) Inventors: Luai M. Al-Hadhrami, Dhahran (SA);
Shafiqur Rehman, Dhahran (SA);
Aftab Ahmad, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 212 days.

(21) Appl. No.: 13/544,671

(22) Filed: Jul. 9, 2012

(65) Prior Publication Data

US 2014/0007696 A1    Jan. 9, 2014

(51) Int. Cl.
*G01F 1/74*    (2006.01)

(52) U.S. Cl.
USPC ........................................ 73/861.04

(58) Field of Classification Search
USPC ........................................ 73/861.04
See application file for complete search history.

(56) References Cited

U.S. PATENT DOCUMENTS

| | | | |
|---|---|---|---|
| 4,393,724 A | | 7/1983 | Werkmann et al. |
| 5,390,547 A | * | 2/1995 | Liu ............................ 73/861.04 |
| 5,551,305 A | | 9/1996 | Farchi et al. |
| 5,741,977 A | | 4/1998 | Agar et al. |
| 6,032,539 A | * | 3/2000 | Liu et al. .................... 73/861.04 |
| 7,147,788 B2 | * | 12/2006 | Tveiten ........................ 210/788 |
| 7,603,916 B2 | | 10/2009 | Gysling |
| 7,654,151 B2 | | 2/2010 | Agar et al. |
| 7,942,065 B2 | * | 5/2011 | Xie ............................ 73/861.04 |

FOREIGN PATENT DOCUMENTS

GB    1208121    10/1970

OTHER PUBLICATIONS

Website, http://www.ep-solutions.com/solutions/iw/optical_multiphase_flowmeter.htm, Downhole Multiphase Flowmeter, two sheets printed from the internet on Mar. 18, 2012.

* cited by examiner

*Primary Examiner* — Jewel V Thompson
(74) *Attorney, Agent, or Firm* — Richard C. Litman

(57) ABSTRACT

The multi-phase flow metering system facilitates the measurement of the flow of oil, gas, and/or other materials from one or more producing petroleum wells. The system has an expansion chamber to separate liquid and as phases. The gas rises through a pipe extending from the top of the expansion chamber. Liquids flow from the bottom of the expansion chamber through a generally U-shaped line having a sediment trap therein. Separate metering devices are provided in the gas outflow line and in the liquid line for accurately measuring the flow of each phase, and in the inlet line for measuring temperature, pressure, and flow at that point. The system includes float valves at the inlet to the gas outflow line and at the liquid phase outlet to control flow through the system. The gas outflow line may continue as a separate line, or reconnect to the liquid outflow line.

19 Claims, 3 Drawing Sheets

MULTI-PHASE FLOW METERING SYSTEM

BACKGROUND OF THE INVENTION

1. Field of the Invention

The present invention relates generally to oil and gas production, and particularly to a multi-phase flow metering system capable of separating the output of a well into liquid and gas phases and measuring the flow of each phase.

2. Description of the Related Art

Subsurface oil and gas deposits are never pure, i.e., oil deposits will always contain gas, water, and/or other materials, and deposits that primarily produce gas will always contain at least some small percentage of other materials as well. Yet, it is important that the output of wells for these various types of deposits be monitored and measured accurately in order to determine whether a well is producing profitably or not, or whether some well treatment or other action may be worthwhile to increase production.

The mixture of oil and gas from a well, i.e., the mixture of both liquid and solid phases of material, creates great difficulties in accurately measuring the output of these materials from a well. It will be seen that while the overall volumes of gas and oil from two different wells may be equal, one may be producing a higher fraction of oil (or oil and water mixture) and a lower fraction of gas than the other. Yet it is very difficult to measure the flow from such wells due to the non-homogeneous nature of such multiphase flows.

The natural tendency for the gas phase to separate from the liquid phase tends to facilitate the accurate measurement of the two phases, once they have been separated. Accordingly, various devices and systems have been developed in the past for separating gaseous and liquid phases from one another in order that each phase may be measured accurately. However, the process is made more difficult due to the entrainment of a third phase of materials, i.e., sand, mud, and other solids that become mixed with the liquid oil and water as it is forced to the surface. As a result, the various devices for measuring the output flow of the various phases of materials from a well have tended to be relatively costly and complex.

Thus, a multi-phase flow metering system solving the aforementioned problems is desired.

SUMMARY OF THE INVENTION

The multi-phase flow metering system comprises an inlet pipe that conducts all of the various materials, i.e., solid, liquid, and gaseous phases, to an expansion chamber where flow velocity is reduced to allow gases to separate from the liquids in which they were entrained. The expansion chamber is horizontally oriented to allow liquids (oil and water) to collect in the lower portion thereof, where they flow through a substantially U-shaped lower passage that substantially restricts flow to purely liquid materials. This permits the flow of the liquids passing therethrough to be accurately measured. The outflow end of the U-shaped liquids passage includes a trap therein for the collection and periodic disposal of sand, mud, and/or other solid sediment entrained in the liquids as they pass through the system. A separate pipe extends from the upper portion of the expansion chamber. Gas flows into this collection pipe for measurement and further processing downstream. The gas pipe may reconnect to the liquid pipe to recombine the liquid and gas phases, in one embodiment.

The system includes various valves, sensors, and measurement devices to control and measure the flow therethrough. Conventional pressure, temperature, and flow sensors are provided in the inlet pipe, and corresponding sensors are located in the gas and liquid pipes extending from the expansion chamber. The sensors communicate with a central processor for data collection and for recording the flows. A shutoff valve is located in the inlet pipe. Additional automatic float valves are located at the entrance to the gas pipe extending from the expansion chamber and at the liquid pipe outlet.

The various portions of the system are specifically dimensioned for optimum efficiency. For example, the expansion chamber has a diameter of substantially three times that of the inlet pipe, and a length of substantially ten times the diameter of the inlet pipe. The horizontal run and the height of the U-shaped liquid passage are also specifically configured. The system may be dimensioned to accept flow from more than a single well output so that multiple wells may be connected to the multi-phase flow metering system for separate or collective metering and monitoring.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
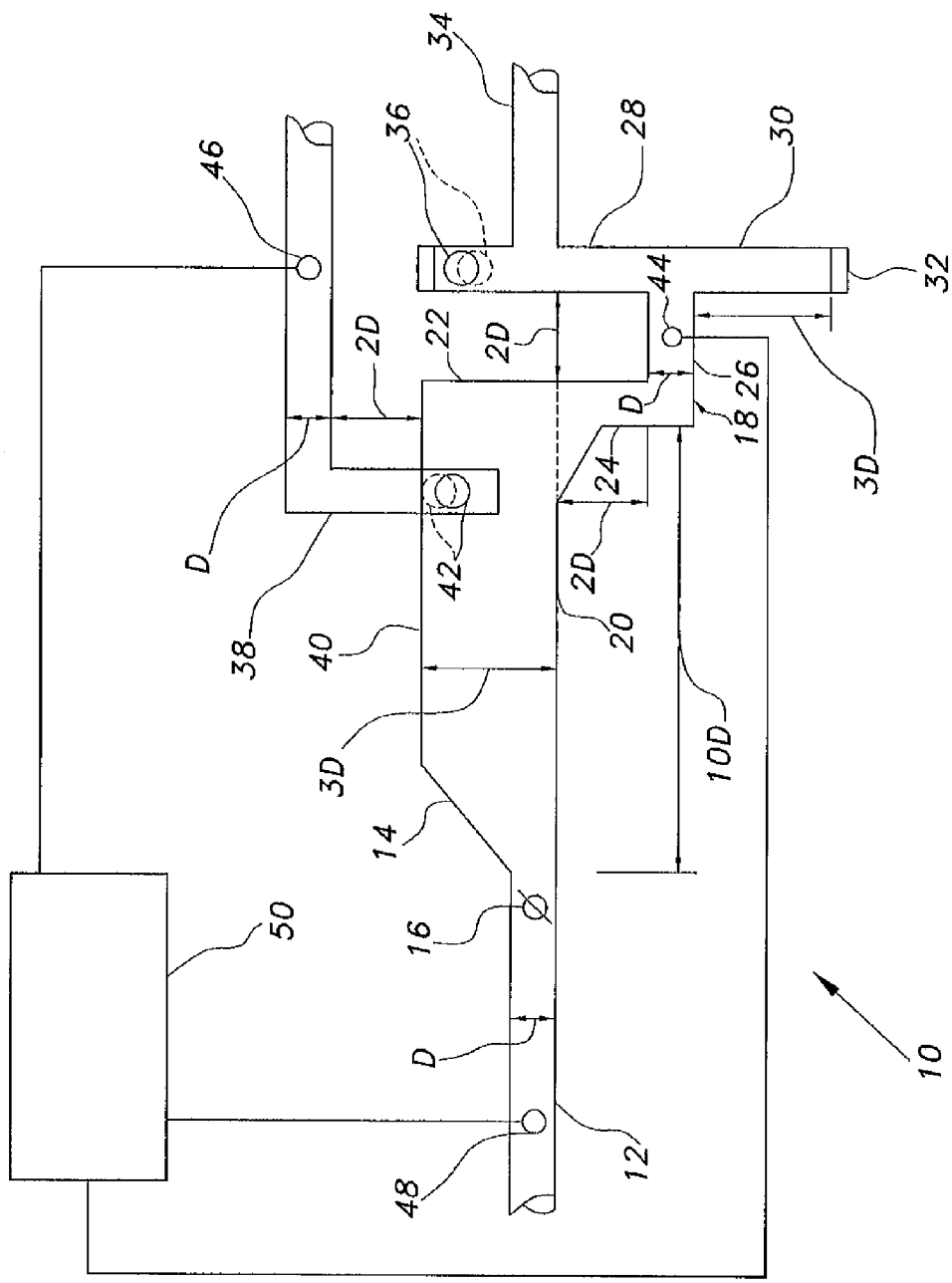
FIG. 1 is a schematic diagram of a first embodiment of a multi-phase flow metering system according to the present invention.
Figure 2:
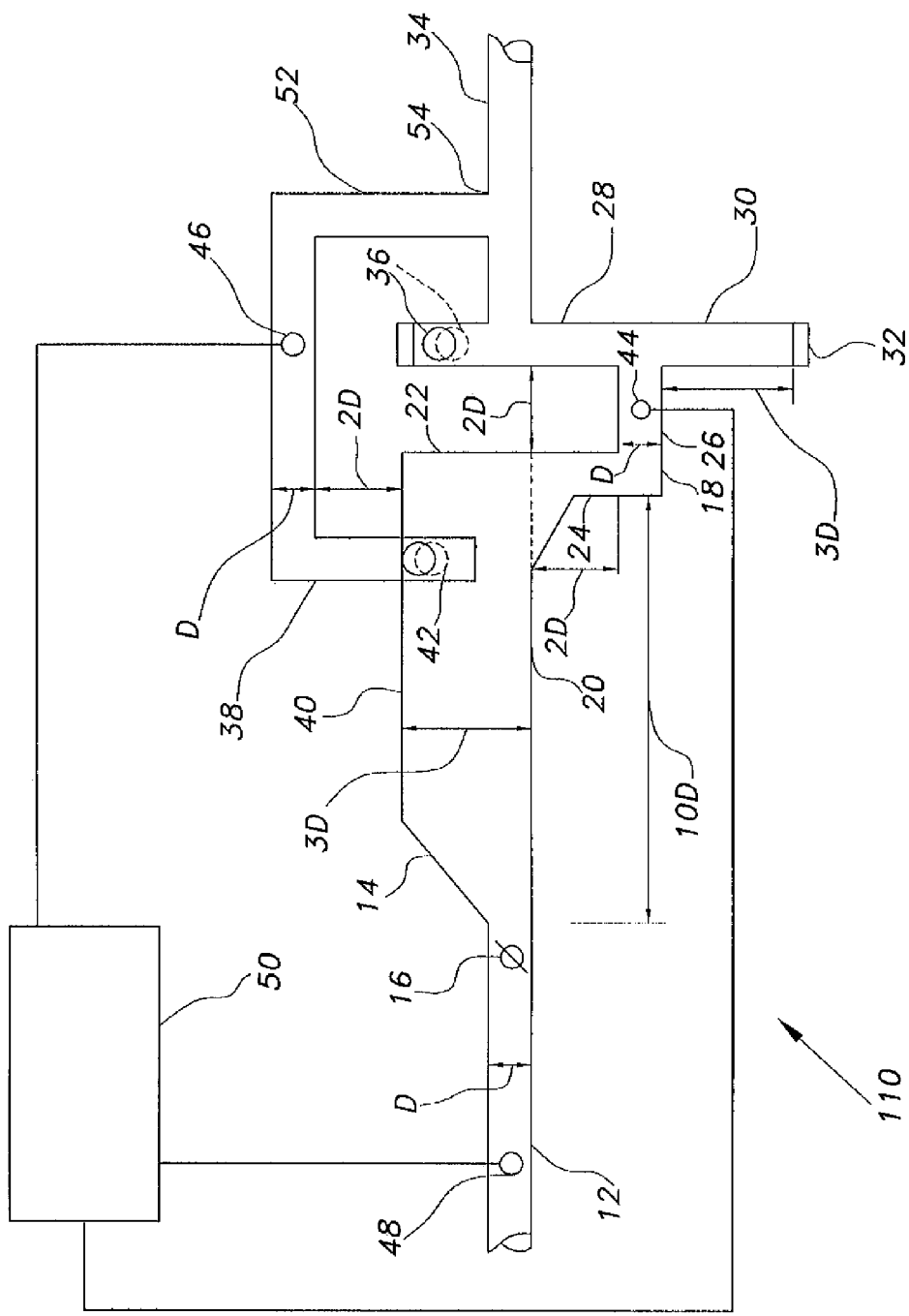
FIG. 2 is a schematic diagram of a second embodiment of a multi-phase flow metering system according to the present invention.
Figure 3:
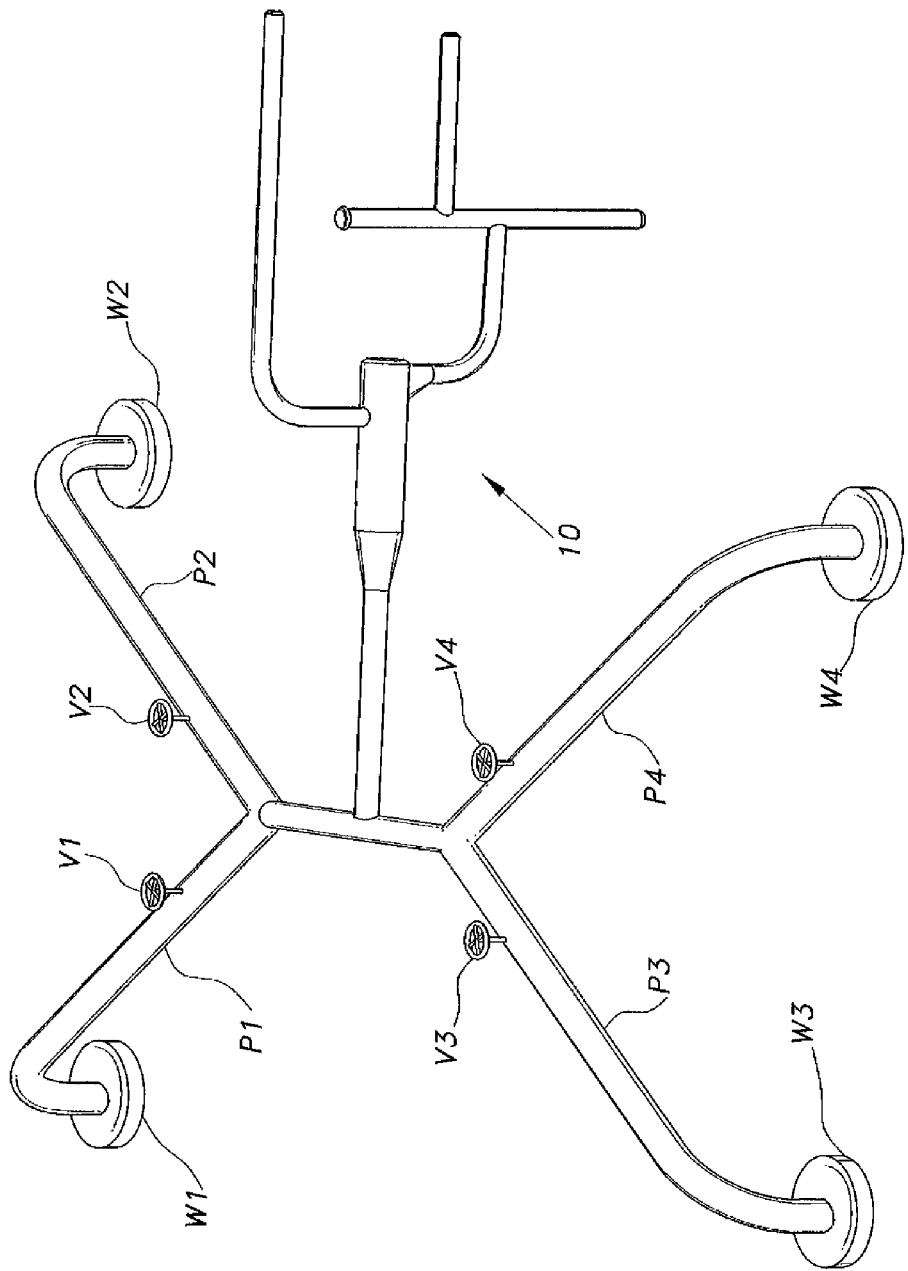
FIG. 3 is a diagrammatic perspective view of input pipes for connecting a plurality of wells to a multi-phase flow metering system for measuring the output of each of the wells individually.

The multi-phase flow metering system comprises a series of pipes and chambers including various valves, measuring devices, and sensors for separating and measuring the liquid and gaseous phases of well output flowing therethrough. FIGS. 1 and 2 provide schematic diagrams of two different but closely related embodiments. FIG. 3 provides a diagrammatic illustration of input pipes connecting a plurality of wellheads to the multi-phase flow metering system to selectively collect and measure the output of each wellhead.

The flow metering system 10 of FIG. 1 includes an inlet pipe or line 12 that is connected to a wellhead and accepts the multiphase output (oil, water, gas, and solid particulates) that flows from the wellhead. The inlet pipe or line 12 connects to an elongate, horizontal expansion chamber 14 that accepts the flow from the inlet line. A selectively adjustable control valve or shutoff valve 16 is preferably installed in the inlet line 12 immediately upstream of the expansion chamber 14.

The expansion chamber 14 has a diameter or cross section significantly larger than that of the inlet line 12, which results in a correspondingly significant reduction in the velocity of flow in the expansion chamber 14 relative to the inlet line 12. The entry end of the expansion chamber 14 has a smoothly tapering entry portion that connects to the inlet pipe 12 in order to minimize turbulent flow as the fluid enters the expansion chamber. Preferably, the expansion chamber 14 has a diameter 3D that is three times the diameter D of the inlet pipe or line 12, resulting in an internal cross-sectional area for the expansion chamber 14 of nine times the cross sectional area of the inlet line 12. This results in a corresponding reduction of flow velocity in the expansion chamber 14 so that the flow velocity through the expansion chamber is only one-ninth of the velocity through the inlet line 12. This results in the liquid and gaseous phases of the fluid separating from one another due to the gas coming out of solution as the liquids settle to the bottom of the expansion chamber. The expansion chamber 12 is relatively long in comparison to its diameter, with a length 10D of some ten times the diameter of the inlet pipe or line 12 as measured from the end of the inlet pipe or line 12 to the liquid phase outlet pipe or line of the expansion chamber. This allows the fluids to remain in the expansion chamber 14 for sufficient time for gases and liquids to separate from one another into their separate phases.

A liquid delivery line 18 extends from the bottom 20 of the expansion chamber 14 at the outlet end 22 thereof, generally longitudinally opposite the inlet pipe or line 12. The liquid delivery line 18 has a diameter D equal to that of the inlet line 12. The liquid delivery line 18 has a generally U-shaped configuration, with a portion 24 extending downward from the chamber 14 for a length that is substantially twice the diameter of the line 18 (which is the same as the diameter of the input line 12), a horizontal portion 26 having a length 2D that is substantially twice its diameter, and a Tee at the end of the horizontal portion 26 that includes an upward portion 28 having a length 2D substantially equal to the portion 24 extending downward from the chamber 14, thus resulting in a total length through the U-shaped section of about six times the line diameter for the liquid delivery line 18.

The horizontal portion 26 of the delivery line 18 forms the lowermost portion of the line 18. The downward portion of the Tee at the end of the horizontal portion 26 forms a sediment trap 30. The sediment trap serves to collect solid particulate matter (sand, etc.) that has been entrained in the liquid flow through the system 10. A cleanout plug or cap 32 is provided at the lowermost end of the trap 30 to provide for periodic emptying of collected particulate matter from the trap 30. The sediment trap 30 preferably has a vertical length or height 3D that is substantially three times the diameter D of the delivery line 18, although other lengths or ratios may be used.

A liquid outlet line 34 extends from the top of the upward or rising portion 28 of the delivery line 18 to conduct liquid from the metering system 10 as it leaves the system. An automatic float-type valve 36 is provided at the juncture of the liquid outlet line 34 with the riser 28 of the delivery line 18. This valve 36 is normally open during normal liquid flow through the system, i.e., lifted to allow flow from the delivery line 18 to pass outward through the outlet line 34. The valve 36 will drop into place in its seat in the event that liquid ceases to flow through the delivery line 18 in order to prevent backflow of liquid from the outlet line 34 into the delivery line 18, and also prevent gas flow through the delivery line 18.

A gas delivery line 38 extends from the top 40 of the expansion chamber 14, from a point at or near the outlet end 22 of the chamber 14. The gas delivery line 38 preferably has a diameter D substantially equal to the diameters D of the inlet pipe or line 12 and the liquid delivery line 18, having a vertical rise of length 2D, or twice the diameter D of the pipes or lines 12 and 18, from the top 40 of the expansion chamber 14 to a generally horizontal portion. An automatic float valve 42 is situated at the inlet end of the gas delivery line 38 in the expansion chamber 14. The float valve 42 functions much the same as the float valve 36 at the outlet of the liquid delivery line 18. It is possible that liquid in the expansion chamber 14 may rise to flow into the gas delivery line 38, where little gas is entrained in the liquid flow from the well and inlet pipe or line 12. The float valve 42 functions to stop the flow of liquid into the gas delivery line 38 by floating up to close its seat at the inlet to the gas delivery line 38 when the liquid rises to a height sufficient to lift the float valve 42 to that point.

The separation of the combined liquid and gas flow from the inlet pipe or line 12 into its liquid and gaseous phases enables the flow of each phase to be measured accurately. A liquid flow monitor 44, e.g., a conventional microwave meter or other flow meter, is installed in the liquid delivery line 18 to measure accurately the flow of liquids through the system 10. Similarly, a gas flow monitor or meter 46 is installed in the gas delivery line 38 to provide an accurate measurement of the flow of gas from the system 10. In addition, a multiphase flow monitor or meter 48 is provided in the inlet pipe or line 12 to measure the temperature, pressure, and flow of the inflowing multi-phase fluid or slurry. These various monitors or meters 44, 46, and 48 all communicate with a data acquisition microprocessor 50 that receives the flow and/or temperature and pressure data from the three meters or monitors 44, 46, and 48, and stores the collected data electronically, and also provides the data to a centralized control facility, The multi-phase flow metering system 110 of FIG. 2 comprises substantially the same components in the same structural relationship as the system 10 of FIG. 1. However, it will be noted that the relationship of the liquid and gas outlet pipes or lines is different in the two drawings. In FIG. 1, the gas delivery line 38 remains separate from the liquid outlet line 34 to allow the liquid and gas to be delivered to different sites for further processing or conveyance. In the multi-phase flow metering system 110 of FIG. 2, the gas delivery line 38 has a gas outlet line 52 extending therefrom, which is joined to the liquid outlet line 34 at a connection 54 downstream of the juncture of the liquid outlet line 34 with the riser 28 of the generally U-shaped liquid delivery line 18. The recombining of the gas and liquid phases of the flow may be desired in some circumstances. In either embodiment, the system 10, 110 provides for the separation of the gaseous and liquid phases of the fluid entering the expansion chamber 14 to allow the two phases to be metered accurately.

FIG. 3 of the drawings illustrates a system of input pipes for connecting the first embodiment of the system 10 to a plurality of wells W1 through W4 by using a corresponding series of pipes or lines P1 through P4. In this manner, a single system 10 (or 110, if desired) is capable of processing the output from multiple wells. Shutoff or control valves V1 through V4 are installed in the corresponding pipes P1 through P4 to enable flow from only a single one of the wells to be conveyed to the multiphase flow metering system 10. However, it will be seen that more than one of the valves V1 through V4 may be opened to allow flow from multiple wells W1 through W4 to flow to the system 10, if desired. Also, while four wells W1 through W4 and corresponding pipes and valves are illustrated in FIG. 3, it will be seen that more or fewer such wells may be connected to the system 10 (or 110). The input system depicted in FIG. 3 allows a single system 10 or 110 to monitor the gaseous and liquid flow rates of one or more of the wells to which the system 10 or 110 is connected to provide accurate data regarding the flow of gas and liquids therefrom.

It is to be understood that the present invention is not limited to the embodiments described above, but encompasses any and all embodiments within the scope of the following claims.

We claim:

1. A multi-phase flow metering system, comprising:
   an inlet line;
   an elongate, horizontally disposed expansion chamber communicating with the inlet line, the expansion chamber having a bottom, a top, and an outlet end opposite the inlet line;
   a liquid delivery line extending from the bottom and outlet end of the expansion chamber;
   a low point disposed in the liquid delivery line;
   a sediment trap depending from the low point of the liquid delivery line; and
   a gas delivery line extending from the top and outlet end of the expansion chamber.

2. The multi-phase flow metering system according to claim 1, further comprising:
   a control valve disposed in the inlet line;
   a multi-phase flow monitor disposed in the inlet line;
   a float valve disposed in the liquid delivery line;
   a liquid flow monitor disposed in the liquid delivery line;
   a float valve disposed in the expansion chamber, at the gas delivery line; and
   a gas flow monitor disposed in the gas delivery line.

3. The multi-phase flow metering system according to claim 1, further comprising:
   a liquid outlet line extending from the liquid delivery line; and
   a gas outlet line extending from the gas delivery line, the gas outlet line being connected to the liquid outlet line.

4. The multi-phase flow metering system according to claim 1, wherein:
   the inlet line has a diameter;
   the expansion chamber has a diameter substantially three times the diameter of the inlet line; and
   the expansion chamber has a length substantially ten times the diameter of the inlet line.

5. The multi-phase flow metering system according to claim 1, wherein:
   the inlet line has a diameter;
   the liquid delivery line has a diameter substantially equal to the diameter of the inlet line and a length substantially six times the diameter of the inlet line;
   the gas delivery line has a diameter substantially equal to the diameter of the inlet line; and
   the gas delivery line has a vertical component extending from the expansion chamber, the vertical component having a length substantially twice the diameter of the inlet line.

6. The multi-phase flow metering system according to claim 1, wherein the liquid delivery line has a substantially U-shaped configuration.

7. A multi-phase flow metering system, comprising:
   an inlet line;
   a liquid and gas phase separator communicating with the inlet line;
   a liquid delivery line extending from the phase separator, the liquid delivery line having a low point; and
   a sediment trap depending from the low point of the liquid delivery line.

8. The multi-phase flow metering system according to claim 7, wherein:
   The liquid and gas phase separator is an elongate, horizontally disposed expansion chamber communicating with the inlet line, the expansion chamber having a bottom, a top, and an outlet end opposite the inlet line, the liquid delivery line extending from the bottom and outlet end of the expansion chamber; and
   a gas delivery line extends from the top and outlet end of the expansion chamber.

9. The multi-phase flow metering system according to claim 7, further comprising:
   a control valve disposed in the inlet line;
   a multi-phase flow monitor disposed in the inlet line;
   a float valve disposed in the liquid delivery line;
   a liquid flow monitor disposed in the liquid delivery line;
   a gas delivery line extending from the phase separator;
   a float valve disposed in the phase separator, at the gas delivery line; and
   a gas flow monitor disposed in the gas delivery line.

10. The multi-phase flow metering system according to claim 7, further comprising:
    a liquid outlet line extending from the liquid delivery line; and
    a gas outlet line extending from the gas delivery line, the gas outlet line being connected to the liquid outlet line.

11. The multi-phase flow metering system according to claim 7, wherein:
    the inlet line has a diameter;
    the expansion chamber has a diameter substantially three times the diameter of the inlet line; and
    the expansion chamber has a length substantially ten times the diameter of the inlet line.

12. The multi-phase flow metering system according to claim 7, wherein:
    the inlet line has a diameter;
    the liquid delivery line has a diameter substantially equal to the diameter of the inlet line and a length substantially six times the diameter of the inlet line;
    the gas delivery line has a diameter substantially equal to the diameter of the inlet line; and
    the gas delivery line has a vertical component extending from the expansion chamber, the vertical component having a length substantially twice the diameter of the inlet line.

13. The multi-phase flow metering system according to claim 7, wherein the liquid delivery line has a substantially U-shaped configuration.

14. A multi-phase flow metering system, comprising:
    an inlet line;
    a control valve disposed in the inlet line;
    a multi-phase flow monitor disposed in the inlet line;
    a liquid and solid phase separator communicating with the inlet line;
    a liquid delivery line extending from the phase separator;
    a float valve disposed in the liquid delivery line;
    a liquid flow monitor disposed in the liquid delivery line;
    a gas delivery line extending from the phase separator;
    a float valve disposed in the phase separator, at the gas delivery line; and
    a gas flow monitor disposed in the gas delivery line.

15. The multi-phase flow metering system according to claim 14, wherein:
    the liquid and gas phase separator is an elongate, horizontally disposed expansion chamber communicating with the inlet line, the expansion chamber having a bottom, a top, and an outlet end opposite the inlet line, the liquid delivery line extending from the bottom and outlet end of the expansion chamber; and
    the gas delivery line extends from the top and outlet end of the expansion chamber.

16. The multi-phase flow metering system according to claim 14, further comprising:

a low point disposed in the liquid delivery line; and a sediment trap depending from the low point of the liquid delivery line.

17. The multi-phase flow metering system according to claim 14, further comprising:

a liquid outlet line extending from the liquid delivery line; and a gas outlet line extending from the gas delivery line, the gas outlet line being connected to the liquid outlet line.

18. The multi-phase flow metering system according to claim 14, wherein:

the inlet line has a diameter;

the expansion chamber has a diameter substantially three times the diameter of the inlet line; and the expansion chamber has a length substantially ten times the diameter of the inlet line.

19. The multi-phase flow metering system according to claim 14, wherein:

the inlet line has a diameter;

the liquid delivery line has a substantially U-shaped configuration with a diameter substantially equal to the diameter of the inlet line and a length substantially six times the diameter of the inlet line;

the gas delivery line has a diameter substantially equal to the diameter of the inlet line; and the gas delivery line has a vertical component extending from the expansion chamber, the vertical component having a length substantially twice the diameter of the inlet line.

* * * * *